United States Patent
Grandgirard et al.

(10) Patent No.: US 8,943,768 B2
(45) Date of Patent: Feb. 3, 2015

(54) GLAZING UNIT COMPRISING AN INSERT HAVING A PRESSURE ELEMENT, METHOD OF MANUFACTURING THE GLAZING UNIT AND INSERT FOR THE GLAZING UNIT

(75) Inventors: Bastien Grandgirard, Marqueglise (FR); Loic Froissard, Choisy-au-Bac (FR); Romain Gonnet, Lacroix Saint Ouen (FR)

(73) Assignee: Saint-Gobain Glass France, Courbevoie (FR)

( * ) Notice: Subject to any disclaimer, the term of this patent is extended or adjusted under 35 U.S.C. 154(b) by 7 days.

(21) Appl. No.: 13/704,870

(22) PCT Filed: Jun. 15, 2011

(86) PCT No.: PCT/FR2011/051351
§ 371 (c)(1),
(2), (4) Date: Dec. 17, 2012

(87) PCT Pub. No.: WO2011/157945
PCT Pub. Date: Dec. 22, 2011

(65) Prior Publication Data
US 2013/0086855 A1 Apr. 11, 2013

(30) Foreign Application Priority Data
Jun. 16, 2010 (FR) ...................................... 10 54765

(51) Int. Cl.
*E06B 7/00* (2006.01)
*E06B 1/04* (2006.01)
(Continued)

(52) U.S. Cl.
CPC ............. *E06B 1/04* (2013.01); *B29C 45/14065* (2013.01); *B29C 45/14377* (2013.01);
(Continued)

(58) Field of Classification Search
CPC ............. E06B 1/04; E06B 1/045; E06B 1/34; E06B 3/677; B32B 3/06

USPC ............ 52/716.5, 204.57, 204.591, 204.593, 52/204.595, 204.597, 204.6, 204.62, 52/204.63, 204.64, 208, 698; 264/263; 428/99

See application file for complete search history.

(56) References Cited

U.S. PATENT DOCUMENTS 3,877,675 A * 4/1975 Shapland ...................... 251/144
4,700,525 A 10/1987 Nieboer et al.
(Continued)

FOREIGN PATENT DOCUMENTS

EP 0 242 223 10/1987
EP 0 526 327 2/1993
(Continued)

OTHER PUBLICATIONS

International Search Report Issued Oct. 20, 2011 in PCT/FR11/51351 filed Jun. 15, 2011.

*Primary Examiner* — Mark Wendell
*Assistant Examiner* — Keith Minter
(74) *Attorney, Agent, or Firm* — Oblon, Spivak, McClelland, Maier & Neustadt, L.L.P.

(57) ABSTRACT

A glazing unit including a pane, a profiled seal portion, and at least one insert having an overmolded part located in the profiled seal portion and a protruding part located outside the profiled seal portion. The insert includes a baseplate that supports a base having a central axis and having a free face, and also a pressure element firmly attached to the insert in at least one bonding region and that extends between the baseplate and the pane, bearing on the pane. The pressure element is also applied against the baseplate or against the base in at least one bearing region located beneath the base, between the base and the pane.

20 Claims, 3 Drawing Sheets

(51) Int. Cl.
  *B29C 45/14* (2006.01)
  *B60J 1/00* (2006.01)
  *B60J 10/02* (2006.01)
  *B32B 3/06* (2006.01)

(52) U.S. Cl.
  CPC .......... *B29C45/14434* (2013.01); *B60J 1/006* (2013.01); *B60J 10/02* (2013.01); *B32B 3/06* (2013.01); *B29C 45/14467* (2013.01)
  USPC .................................................... 52/204.591

(56) References Cited

U.S. PATENT DOCUMENTS

| 4,830,804 | A | * | 5/1989 | Weaver | 264/139 |
| 4,861,540 | A | * | 8/1989 | Nieboer et al. | 264/263 |
| 5,027,569 | A | * | 7/1991 | Keys | 52/208 |
| 5,115,612 | A | * | 5/1992 | Newton et al. | 52/208 |
| 5,456,049 | A | * | 10/1995 | Goto et al. | 52/208 |
| 5,473,129 | A | * | 12/1995 | Markowski et al. | 200/293 |
| 5,475,956 | A | * | 12/1995 | Agrawal et al. | 52/208 |
| 5,676,898 | A | * | 10/1997 | Yokota et al. | 264/219 |
| 5,704,173 | A | * | 1/1998 | Repp et al. | 52/204.62 |
| 6,089,646 | A | * | 7/2000 | Xu et al. | 296/146.15 |
| 6,334,971 | B1 | * | 1/2002 | Huang | 264/157 |
| 6,620,365 | B1 | * | 9/2003 | Odoi et al. | 264/261 |
| 6,813,865 | B2 | * | 11/2004 | Peterson | 52/506.05 |
| 7,294,386 | B2 | * | 11/2007 | Murase et al. | 428/99 |
| 2001/0011694 | A1 | * | 8/2001 | Lycett | 248/228.1 |
| 2009/0211196 | A1 | * | 8/2009 | Lilli | 52/698 |
| 2010/0104803 | A1 | | 4/2010 | Nakagawa et al. | |
| 2010/0166987 | A1 | | 7/2010 | Bodin et al. | |
| 2011/0011024 | A1 | * | 1/2011 | Pellicer | 52/583.1 |
| 2011/0277396 | A1 | * | 11/2011 | Schneider | 52/126.7 |
| 2013/0086855 | A1 | * | 4/2013 | Grandgirard et al. | 52/204.591 |
| 2013/0186018 | A1 | * | 7/2013 | Grandgirard et al. | 52/204.72 |

FOREIGN PATENT DOCUMENTS

| EP | 2 133 227 | 12/2009 |
| FR | 2 916 380 | 11/2008 |

* cited by examiner

GLAZING UNIT COMPRISING AN INSERT HAVING A PRESSURE ELEMENT, METHOD OF MANUFACTURING THE GLAZING UNIT AND INSERT FOR THE GLAZING UNIT

TECHNICAL FIELD

The present invention relates to a glazing unit comprising a pane, a profiled seal portion and at least one insert, this glazing unit being intended to be positioned on and/or fastened to a structure, especially a motor vehicle body element, by means of at least one insert. The invention also relates to a method of manufacturing such a glazing unit and to the insert used for this purpose.

BACKGROUND

In order for a glazing unit to be positioned on and/or fastened to a structure, especially a motor vehicle body, it is in fact known to use at least one pin and preferably several pins, or one or more inserts, which are fastened beforehand to the glazing unit by partly embedding it or them in a plastic encapsulating material during what is called an encapsulation operation.

To carry out such an operation, the glazing unit and the insert or inserts are placed in a mold, in the desired relative position, and then a suitable plastic, for example polypropylene, is injected into the molding cavity of the mold so as to encapsulate a part of the insert or inserts on the glazing unit so as to fasten it or them to the latter.

Such inserts usually have three parts, namely a plane central part, or base, and, extending either side of said base, respectively a part that forms an active zone and is intended to cooperate with the body element and a part that is overmolded in the constituent material of the profiled sealing bead and includes a so-called pressure element, as explained below.

An insert may thus comprise a baseplate which is overmolded in said profiled seal portion and supports a base having a central axis and having a free face located outside said profiled seal portion, and also a pressure element which is firmly attached to the insert in at least one bonding region and extends between the baseplate and the pane, bearing on the latter.

During the encapsulation operation, the base, the baseplate and the pressure element of the insert are encapsulated in the encapsulation material and measures are taken to ensure that its active part is clear of this encapsulation material. To do so, the insert is placed in a mold so that its active part is isolated in a closed positioning cavity of said mold and so that its base and the part of the pane to be encapsulated are positioned in another cavity of the mold, called the molding cavity, into which the encapsulation material is injected.

A first difficulty extends from the fact that usually the glazing units for a vehicle, and in particular a motor vehicle, have complex shapes such that they require the use of specific inserts, the shape and size of the pressure element of which are dependent on the way they are positioned on the glazing unit. It may therefore be necessary, for one glazing model (i.e. a series of glazing units), to use several inserts having different shapes, thereby complicating the implementation of the overmolding operation insofar as each of the inserts has to be identified and positioned individually for each glazing unit.

A second difficulty stems from the fact that the sealing between the molding cavity and the isolated positioning cavity is not always perfect so that, during injection, it may happen that the injected substance tends to flow from the molding cavity into the positioning cavity, with the effect that the active part of the insert is partially encapsulated. As a consequence, subsequent problems in positioning said active part arise and/or difficulties in fastening it are encountered, so that the entire glazing unit runs the risk of being discarded as a defective component.

To alleviate this drawback, European patent application EP 0468713 proposes to place around the active positioning part, before the encapsulation operation, an elastomer seal which, when the insert is in position in the mold, is applied on the periphery of the positioning cavity so that it constitutes a seal between this cavity and the molding cavity, thus protecting the active part of the insert during the injection. Apart from the fact that such an arrangement is not always effective, it also has the drawback of complicating the manufacturing process.

International patent application WO 2008/145938 proposes to use an insert comprising a base placed on a baseplate of larger width, at the two ends of which two elastic lugs are respectively positioned which, during the overmolding operation, apply the base supporting the active part of the insert against the entrance of the positioning cavity by counter-reaction under the effect of the thrust of the pane.

Although in arrangements in which the pane is substantially parallel to the baseplate (or the base) the application force exerted by the lugs does have the effect of uniformly applying the base of the insert against the periphery of the entrance of the positioning cavity, this is no longer the case when the surface of the pane is inclined to the baseplate or to the base.

SUMMARY

The object of the present invention is to remedy these drawbacks by providing a glazing unit in which the shape of the pressure element of at least one insert, and preferably of all the inserts, is such that this insert or these inserts can be used whatever their position on the glazing unit, allowing encapsulation of the type described above to be carried out, and which insert or inserts prevent the encapsulation material from entering the positioning cavity of the insert, and to do so without providing a seal.

One subject of the present invention is thus a glazing unit as claimed in claim 1. This glazing unit comprises a pane, a profiled seal portion and at least one insert having an overmolded part located in said profiled seal portion and a protruding part located outside said profiled seal portion for said glazing unit to be positioned on and/or fastened to a structural element, especially a body element of a vehicle, said insert comprising a baseplate which is overmolded in said profiled seal portion and supports a base having a central axis and having a free face located outside said profiled seal portion, and also a pressure element which is firmly attached to the insert in at least one bonding region and extends between the baseplate and the pane, bearing on the latter, said glazing unit being noteworthy in that the pressure element is also applied against the baseplate or against the base in at least one bearing region (which is different from the bonding region) which is located beneath the base, between the base and the pane. The bearing region is not necessarily just beneath the base: the baseplate is preferably present between the bearing region and the base, and the pressure element is then applied against the baseplate. There is only one bearing region, irrespective of the number of bonding regions.

Thus, the pressure element, which is bonded to the insert, bears against the pane and is applied against the base or baseplate. The term "applied" should be understood in the context of the present invention to mean that there is a physical contact which is created, with transmission of a force: in the bearing region, the pressure element is physically well separated from the base or the baseplate against which it is in contact and applies a force against the base or baseplate respectively.

Preferably, the bearing region of the pressure element is located substantially in the extension of the central axis of the base. Thus, the force applied by the pressure element in the bearing region against the base or the baseplate is a force directed substantially along the central axis of the base.

Also preferably, the baseplate and the base are each substantially flat; the base is preferably a circular disk and the baseplate is preferably a circular or oval disk. The baseplate and the base preferably each have a central axis and these axes are preferably coincident.

In general, the baseplate projects around the base so as to increase the anchoring of the insert in the encapsulation. In order for this anchoring to be further improved, this surface may be pierced by at least one hole for anchoring to the latter. Of course, in a variant of the invention the base and the baseplate may have the same shape and size.

The pressure element may consist of a single elastic deformable lug, a first end of which is bonded to the baseplate in the bonding region and a second end of which is applied by the pane against the baseplate or against the base in the bearing region.

The baseplate may thus have a peripheral outline larger in size than the peripheral outline of the base, said baseplate preferably having at least one hole passing through the thickness thereof, it being possible in this case for said baseplate not to be present beneath the entire base, but under only part of the base, for example just on the periphery of the base.

However, it is also possible for the baseplate to have the same peripheral outline as the base—the baseplate and the base are thus coincident—otherwise a complete or partial peripheral shoulder may be provided between the baseplate and the base.

The pressure element preferably consists of at least one lug and more preferably consists of at least one pair of coplanar lugs that are placed symmetrically with respect to the central axis of the base, each lug being preferably oriented relative to said baseplate in the bonding region at an angle of between 20° and 80°, or even between 30° and 60°, to the direction of the central axis of the base.

The lug, or each lug, is plastically deformable. When the pressure element has several lugs, each lug has a bonding region where it is bonded to the insert, but, all in all, there is only one bearing region created, i.e. all the lugs come into contact with the baseplate (or as the case may be with the base) at the same place.

The term "plastically" is understood to mean here the behavior of being formed under the effect of a load: once the load has been removed, the element in question remains deformed and does not return to its initial configuration.

In a preferred embodiment, each lug has two legs: namely a first leg which is inclined away from said baseplate and a second leg which extends the first and is inclined toward the baseplate, the angle between said two legs of a lug being preferably between 80° and 100°.

In this embodiment, the second leg preferably has a shorter length than the first leg, the second leg more preferably having a length substantially equal to half the length of the first leg.

The ends of two second legs of a pair of coplanar lugs are preferably bonded together.

The invention is very specifically applicable when the angle between the free face and an adjacent face of the pane is between 0° and 40°, including these values, or even between 0° and 40°, excluding 0°, and in particular when this angle is between 5° and 40° including these values, or even between 7° and 30° including these values.

In other words, the invention may be used when the angle between the general central axis of the insert is perpendicular to the pane in its intersection with the adjacent face of the pane, but is most particularly beneficial when the general central axis of the insert is not perpendicular to the pane in its intersection with the adjacent face of the pane.

Preferably, if the glazing unit has several inserts, it will comprise at least two inserts according to the invention, the protruding parts of said inserts being oriented in space along nonparallel axes.

Thus, the respective bases of the two inserts at least have nonparallel central axes in space.

The subject of the present invention is also a method of manufacturing a glazing unit according to the invention, said glazing unit comprising a pane, a profiled seal portion and at least one insert having an overmolded part located in said profiled seal portion and a protruding part located outside said profiled seal portion in order for said glazing unit to be positioned on and/or fastened to a structural element, especially a body element of a vehicle, said insert comprising a baseplate which supports a base having a central axis and having a free face, and also a pressure element which is firmly attached to the insert in at least one bonding region, said method comprising, in succession, at least the following steps:

the pane is placed in a first part of a mold;
the insert is placed in a second part of the mold, so that the protruding part is positioned in a positioning cavity provided in this second mold part and so that the free face of its base bears on the periphery of the entrance of the positioning cavity;
the two mold parts are closed so as to form a molding cavity (in order to isolate the positioning cavity from the molding cavity); and
a plastic constituting said profiled sealing bead is injected into the molding cavity so as to overmold, onto the pane, the baseplate, the base and the pressure element that extends between the baseplate and the pane, bearing on the latter, the free face and the protruding part both being outside said profiled seal portion.

The method according to the invention is noteworthy in that, while the mold is closed, the pressure element is deformed and applied against the baseplate or against the base in at least one bearing region which is located beneath the base, between the base and the pane.

The bearing region of the pressure element is preferably located substantially in the extension of the central axis of the base.

If the glazing unit includes at least two inserts according to the invention, the protruding parts of said inserts are then preferably oriented, before molding, in positioning cavities of said second mold part along nonparallel axes.

The subject of the present invention is also an insert for a glazing unit according to the invention, for the glazing unit to be positioned on and/or fastened to a structural element, especially a body element of a vehicle, said insert comprising a baseplate that supports a base having a central axis and having a free face, and also a pressure element which is firmly attached to the insert in at least one bonding region.

As indicated above, the pressure element consists of at least one lug and more preferably consists of at least one pair of coplanar lugs that are placed symmetrically with respect to the central axis of the base, the or each lug being preferably oriented with respect to said baseplate in the bonding region at an angle of between 20° and 80°, or even between 30° and 60°, to the direction of the central axis of the base. The lug, or each lug, is preferably plastically deformable.

Thus, if the profiled sealing bead of a glazing unit according to the invention is removed, it may be clearly seen that the configuration of the pressure element inside the profiled sealing bead is different from the configuration of a pressure element before its incorporation into the profiled sealing bead.

Advantageously, the pressure element according to the invention enables the insert to be pressed against an adjacent face of the pane and serves to apply a reaction force against the base (or the baseplate) in order for the base to be effectively maintained against the entrance of the positioning cavity and thus for it to be sealed.

Applying this reaction force in the direction of the central axis of the base makes it possible to achieve perfect sealing all around the contact between the base and the entrance of the positioning cavity for the protruding part of the insert.

BRIEF DESCRIPTION OF THE DRAWINGS

Described below, by way of nonlimiting example, are several embodiments of the present invention, with reference to the appended drawing in which.

DETAILED DESCRIPTION

In these figures, the proportions of the various elements have been respected and the elements in the background have not in general been shown, so as to make it easier to understand the figures.

Figure 1:
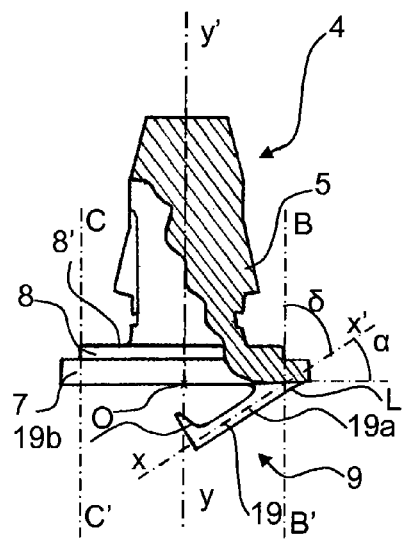
FIG. 1 is an axial partial sectional view of a first embodiment of an insert according to the invention.
Figure 2:
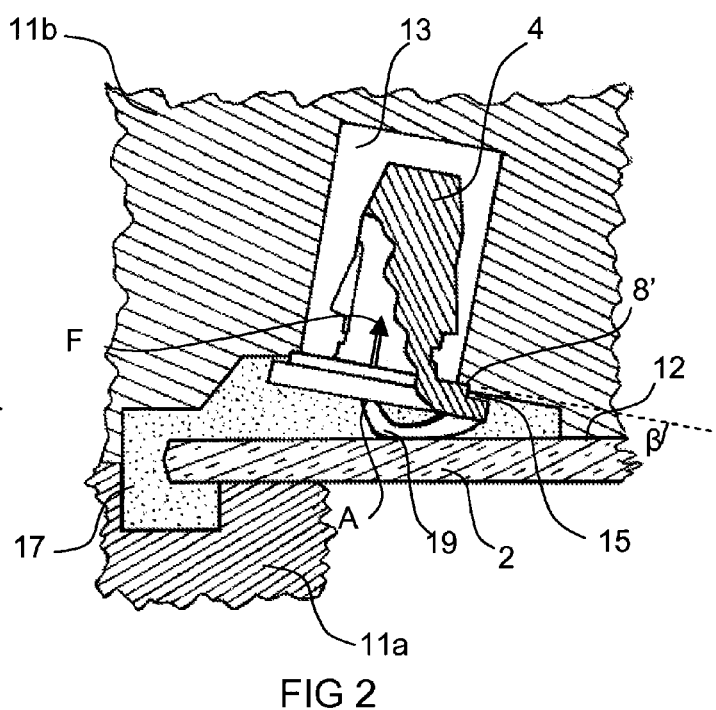
FIG. 2 is an axial sectional view of the insert shown in FIG. 1, after it has been positioned in a mold part, after the mold has been put into place and after the injection phase.

FIGS. 1 and 2 show an insert 4 according to the invention, which is intended to be mounted on a pane 2. This insert has a cylindrical protruding part 5, of central axis yy', which constitutes its active part and terminates at its free end in a frustoconical part intended to make it easier to position it in the opening in the component on which a glazing unit 1 has to be mounted and especially on a body element. The protruding part 5 is provided with lateral flanges which are intended for being clip-fastened onto the body element.

At its other end, the protruding part 5 is connected to a flat circular base 8 which, in the present embodiment of the invention, is on top of a likewise circular flat baseplate 7 of larger diameter than the base. The thickness of the baseplate here is 2 mm and the thickness of the base is 1 mm.

In FIG. 1, which illustrates the insert before it is used, the lower face of the baseplate 7 supports a pressure element, which consists of a lug 19, a first leg 19a of which is oriented in a bonding region L, where it is bonded to the insert, along an axis xx' which is inclined to the plane of the baseplate 7 at an angle α of about 30°, and a second leg 19b of which, formed by its free end, is substantially perpendicular to the first leg, following on from the first part.

In FIG. 1, the lug is thus oriented with respect to said baseplate 7 in the bonding region L at an angle δ, complementary to the angle α with respect to 90°, to the direction of the central axis yy' of the base 8, this angle δ being about 60°.

The central axis yy' is also the general central axis of the insert.

As shown in FIG. 2, to ensure that the insert 4 is encapsulated on the pane 2, the successive steps as described below are carried out:

the pane 2 is placed in a lower part 11a of a mold;
the insert (or various inserts) 4 is (or are each) placed in a cavity 13 provided in an upper part 11b of the mold. Preferably, as shown in FIG. 2, the entrance of this cavity is recessed with a circular groove 15 corresponding to the dimensions of the base 8, so that the latter fits into this groove. Thus a kind of baffle for sealing the cavity 13 better is created; and
the mold is closed. During this operation, the lug 19 is pushed back by the pane 2 and deforms so that its free end comes into contact with the baseplate 7 and exerts, on the baseplate 7, a force which has the effect of applying the periphery of the base 8, i.e. the free surface 8', of the insert 4 against the bottom of the groove 15. The length of the first part of the lug 19 will be determined so that the free end of the latter bears on the baseplate 7 and more precisely against that face of the baseplate which is turned toward the pane 2, and in an application or bearing region A of said baseplate, which is located beneath the base, i.e. in a region which lies between the dot-dash lines BB' and CC' in FIG. 1. Preferably, this first part of the lug 19 is given a length such that the bearing region A lies close to the center O of the base 8, along the axis yy' at the lower end of the baseplate 7.

Of course, the lug 19 of the insert is given the appropriate dimensions enabling it, during this deformation, to apply the upper face of the base 8 against the bottom of the circular groove 15 with a force F (illustrated by the double arrow), the orientation of which is thus controlled and the value of which is also controlled by the choice of the material of the lug and by its dimensions. The straight, first branch 19a of the lug 19 and also the elastic modulus of the material constituting the insert, and more particularly the lug 19, may thus be preferably varied so that the deformation force exerted by the pane 2 on said lug is less than that having the effect of breaking or damaging the pane, while still being sufficient to ensure that the positioning cavity is properly sealed so that the injected material cannot flow into said cavity; and the plastic is injected into the molding cavity 17.

Of course, although most of the time the constituent elements of the insert 4, namely its active part 3, its baseplate 7, its base 8 and its lug 19, are formed as one piece, these elements may also, in an alternative embodiment of the present invention, be formed from several assembled pieces, which may be made of plastic or metal, depending on the specific stresses to which the insert runs the risk of being subjected.

Figure 3:
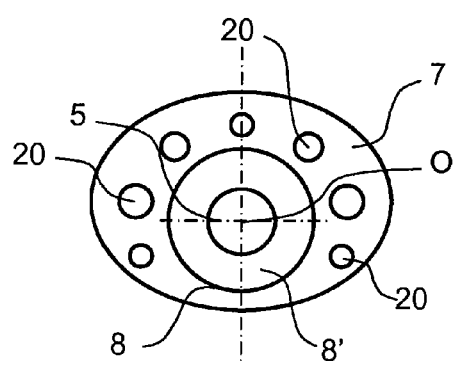
FIG. 3 is a top view of another embodiment of an insert according to the invention.

The base 8 will usually have a circular shape, but the baseplate 7 may have any shape appropriate to the type of glazing in question. As FIG. 3 shows, the baseplate 7 may for example have an elliptical shape and its center may be different from the center O of the base 8. Moreover, to improve the anchoring of the insert 4 in the plastic of the encapsulation, the baseplate 7 may be drilled with holes 20, the shape and dimensions of which will depend on their arrangement on the baseplate 7.

The present invention is particularly advantageous in that it applies not only to glazing units in which the base 8 of the insert 4 is parallel thereto, but also to glazing units for which the base 8, or even also the baseplate 7, are not parallel to the pane 2, as shown in the figures.

Of course, the insert 4 may have several lugs, especially lugs 19 placed in pairs in the same plane, symmetrically with respect to the central axis yy' of the insert.

Figure 4:
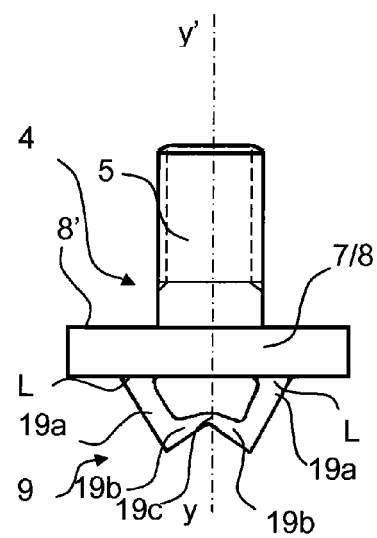
FIG. 4 is a plan view of another embodiment of an insert according to the invention.
Figure 5:
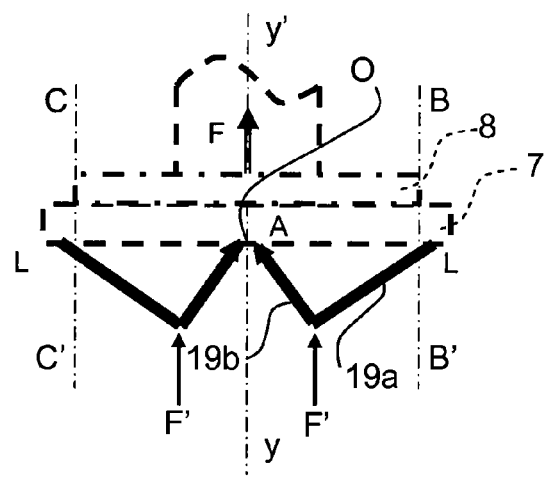
FIG. 5 is a schematic view illustrating the forces upon closing the mold for an insert having two deformable lugs.

In one embodiment of the invention, which is shown in FIG. 4, and in schematic form in FIG. 5, the pressure element 9 comprises two lugs 19 and the baseplate 7 and the base 8 have the same shape and the same peripheral dimensions, and are thus coincident.

The legs 19a and 19b forming these lugs are given lengths such that the bearing region A of said lugs beneath the baseplate 7 (and indirectly beneath the base 8) lies beneath the base 8 and preferably close to the center O of the base 8, when they deform under the action of the forces F' exerted by the pane 2. Thus, the resultant force F (illustrated by the double arrow) in this bearing region A is properly directed along the central axis yy'.

Figure 6:
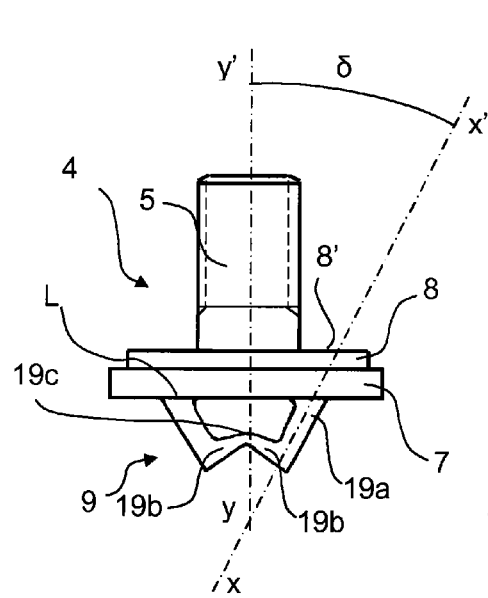
FIG. 6 is a side view of another embodiment of an insert according to the invention.
Figure 7:
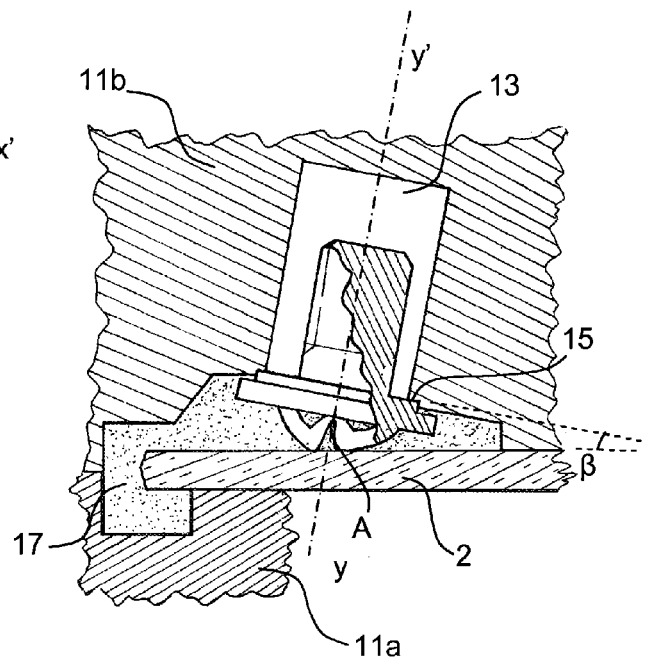
FIG. 7 is an axial sectional view of the insert shown in FIG. 6, which is positioned in a mold part, after the glazing unit has been placed therein and after the injection phase.
Figure 8:
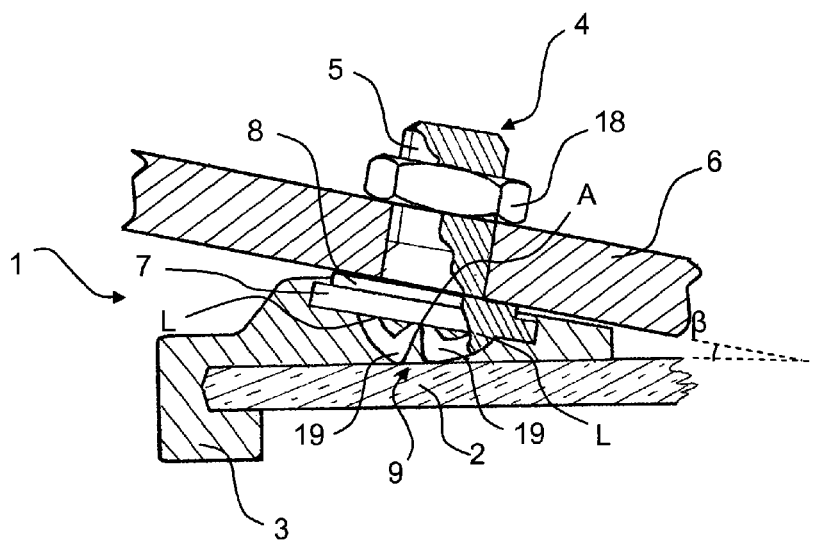
FIG. 8 is a partial sectional view of a glazing unit according to the invention which is fastened to a body element by means of an insert of the type that is shown in FIGS. 6 and 7.

In an embodiment of the invention shown in FIGS. 6 to 8, the insert 4 has a cylindrical protruding part 5, which is provided with a thread. This makes it possible, once the inserts 4 have been overmolded, and as shown in FIG. 8, to fasten the glazing unit 1 to a body 6 of a vehicle by means of a nut 18. In this embodiment of the invention, the pressure element can consist of two lugs lying in the same axial plane, these being symmetrical with respect to the central axis yy', as in FIGS. 4 and 5.

Each lug 19 is formed from a first leg 19a which is firmly attached to the baseplate 7 in a bonding region L lying at approximately one half of the diameter of said baseplate and is inclined toward the interior along an axis xx' making an angle δ of about 30° to the central axis yy'. These two first legs are extended by two second legs 19b of shorter length which return toward the baseplate 7 and join together halfway between said first legs, so as to form a W.

The second legs 19b make an angle of about 90° with each other at their join 19c.

As shown in FIGS. 6 and 7, the first legs 19a may have a substantially constant cross section, whereas the second legs 19b become narrower on going from the first legs toward the join 19c between the two second legs 19b.

It has been found that such a W-shaped geometry of the pressure element 9 of the insert makes it possible, for forces exerted on the latter by a pane, one face 12 of which makes an angle β with the free face 8', to deform the pressure element in such a way that the bearing region for application of the latter on the baseplate (or the base) lies close to the center O of the baseplate or base. Thus, the upper face of the base 8 is applied uniformly on the bottom of the groove 15, thereby guaranteeing a good seal.

This angle β is preferably between 0° and 40°, including these values, or even between 0° and 40° excluding 0° and in particular is between 5° and 40°, including these values, or even between 7° and 30° including these values.

The present invention thus makes it possible to use inserts that are identical over the entire length of the periphery of a glazing pane, even when the pane is curved.

The present invention thus makes it possible, unlike the inserts of the prior art that require various specific models to be produced according to the angle made by the glazing pane with the baseplate of the insert, to position identical inserts in regions of the glazing unit that are not symmetrical or to position identical inserts on an unsymmetrical glazing unit (for example a rear quarter window).

The insert according to the invention is preferably made of various plastics, optionally filled with glass fiber, and those having an elastic modulus between 200 MPa and 20 GPa, preferably between 1 and 10 GPa, may be particularly used.

The following may especially be used: polypropylene (elastic modulus=1.8 GPa); polyamides (elastic modulus=2.5 GPa); polypropylene filled with 30% glass fiber (elastic modulus=6 GPa); polyamides filled with 30% glass fiber (elastic modulus=9.5 GPa); polyoxymethylene (elastic modulus=3.1 GPa), etc.

The insert 4 according to the invention is therefore manufactured by molding.

To give an example, an insert according to the invention made of a material having an elastic modulus of around 3 GPa, and the area of contact of the base 8 of which with the mold is 100 $mm^2$, was subjected to a deformation under the action of the pane 2 upon closing the mold, generating a force of around 100 N, so that the insert is applied against the mold with a pressure of 1 MPa. The measurements carried out have shown that this stress was uniformly distributed around the periphery of the base 8 in contact with the entrance of the positioning cavity for the insert. Moreover, it is known that under such a stress this positioning cavity is considered to be sealed against the flow of molding material.

Figure 9:
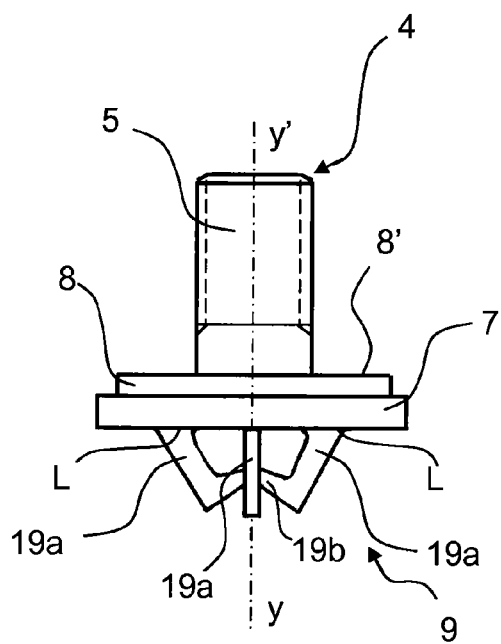
FIGS. 9 and 10 show another embodiment of an insert, shown from the side and viewed from beneath respectively.
Figure 10:
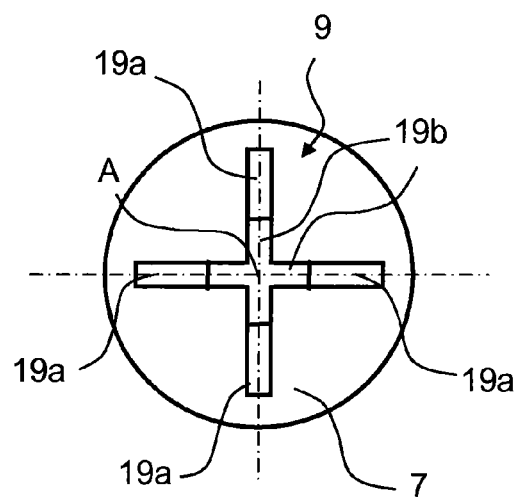

According to the present invention, it is also possible to produce a pressure element consisting of several elements having a W-profile as described above, which are arranged in the form of a cross, and especially in pairs in perpendicular planes, as shown in FIGS. 9 and 10.

In one particular embodiment, which is not illustrated, that face of the baseplate 7 which is turned toward the pane 2 is not flat but has a surface portion which is hollowed toward said protruding part 5. This surface portion, which is thus recessed with respect to the rest of the surface of that face of the baseplate 7 turned toward the pane 2, may be used to create a particular bearing region A.

It is thus possible to create a small recess at the point A in FIG. 2, in FIG. 7 or in FIG. 10 so as to guide the second leg(s) 19b so that contact with the face of the baseplate takes place exactly at the desired point.

This recess may be in the form of a circular channel on the surface, or in the form of an elongate groove. Its shape in cross section may be straight or conical and the depth of the recess may be at least one tenth of an mm and may be up to the entire thickness of the baseplate 7 (i.e. a hole emerging on either side of the baseplate).

The invention claimed is:

1. A glazing unit comprising:
    a pane;
    a profiled seal portion; and
    at least one insert including:
        an overmolded part located in the profiled seal portion,
        a protruding part located outside the profiled seal portion via which the glazing unit is disposed on one of a structural element and a body element of a vehicle,
        a baseplate that is overmolded in the profiled seal portion,
        a base supported on the baseplate, the base having a central axis and a free face located outside the profiled seal portion, and a pressure element firmly attached to the baseplate on a side opposite the base in at least one bonding region, the pressure element extending between the baseplate and the pane and bearing on the pane, wherein the pressure element further bears against the baseplate in at least one bearing region located beneath the baseplate, between the baseplate and the pane.

2. The glazing unit as claimed in claim 1, wherein the at least one bearing region of the pressure element is located substantially in an extension of the central axis of the base.

3. The glazing unit as claimed in claim 1, wherein the baseplate has a same peripheral outline as the base.

4. The glazing unit as claimed in claim 1, wherein the baseplate has a peripheral outline larger in size than a peripheral outline of the base.

5. The glazing unit as claimed in claim 1, wherein the pressure element includes one of a lug and a pair of coplanar lugs that are placed symmetrically with respect to the central axis of the base, wherein each lug is oriented relative to the baseplate in the at least one bonding region at an angle δ between 20° and 80° to a direction of the central axis of the base.

6. The glazing unit as claimed in claim 5, wherein each lug includes a first leg inclined away from the baseplate and a second leg that extends the first leg and is inclined toward the baseplate.

7. The glazing unit as claimed in claim 6, wherein the second leg has a shorter length than the first leg.

8. The glazing unit as claimed in claim 7, wherein a length of the second leg is substantially equal to half a length of the first leg.

9. The glazing unit as claimed in claim 6, wherein each lug includes a first leg and a second leg, wherein an angle between the first and second legs of a lug is between 80° and 100°.

10. The glazing unit as claimed in claim 5, wherein the pressure element includes the pair of coplanar lugs, each lug including a first leg and a second leg, and wherein respective ends of the second legs are bonded together.

11. The glazing unit as claimed in claim 5, wherein each lug is oriented with respect to the baseplate in the at least one bonding region at an angle 6 of between 30° and 60° to a direction of the central axis of the base.

12. The glazing unit as claimed in claim 1, wherein an angle β between a free face and an adjacent face of the pane ranges from 0° to 40°.

13. The glazing unit as claimed in claim 1, comprising at least two inserts, the protruding parts of the inserts being oriented in space along nonparallel axes.

14. The glazing unit as claimed in claim 1, wherein a face of the baseplate which is turned toward the pane has a hollowed surface portion toward the protruding part.

15. The glazing unit as claimed in claim 1, wherein the baseplate has at least one hole passing therethrough in a thickness direction thereof.

16. A method of manufacturing a glazing unit as claimed in claim 1, the glazing unit including a pane, a profiled seal portion and at least one insert including an overmolded part located in the profiled seal portion and a protruding part located outside the profiled seal portion for the glazing unit to be positioned on and/or fastened to a structural element, or to a body element of a vehicle, the insert including a baseplate that supports a base having a central axis and having a free face, and also a pressure element firmly attached to the insert in at least one bonding region, the method comprising:

placing the pane in a first part of a mold;

placing the insert in a second part of the mold, so that the protruding part is positioned in a positioning cavity provided in the second mold part and so that the free face of its base bears on a periphery of an entrance of the positioning cavity;

closing the two mold parts so as to form a molding cavity; and injecting a plastic constituting the profiled seal portion into the molding cavity so as to overmold, onto the pane, the baseplate, the base and the pressure element that extends between the baseplate and the pane, bearing on the pane, the free face and the protruding part both being outside the profiled seal portion, wherein, while the mold is closed, the pressure element is deformed and applied against the baseplate or against the base in at least one bearing region located beneath the base, between the base and the pane.

17. The manufacturing method as claimed in claim 16, wherein the bearing region of the pressure element is located substantially in an extension of the central axis of the base.

18. The manufacturing process as claimed in claim 16, wherein the glazing unit includes at least two inserts, the protruding parts of the inserts being oriented before molding in positioning cavities of the second mold part along nonparallel axes.

19. An insert for a glazing unit, via which the glazing unit is disposed on one of a structural element and a body element of a vehicle, the insert comprising:

a baseplate;

a base supported on the baseplate, the base having a central axis and having a free face away from the baseplate; and a pressure element firmly attached to the baseplate on a side opposite the base in at least one bonding region, the pressure element including one of a lug and a pair of coplanar lugs that are placed symmetrically with respect to the central axis of the base, wherein each lug is oriented with respect to the baseplate in the at least one bonding region at an angle δ of between 20° and 80°, to a direction of the central axis of the base.

20. The insert as claimed in claim 19, wherein each lug is oriented with respect to the baseplate in the at least one bonding region at an angle δ of between 30° and 60° to a direction of the central axis of the base.

* * * * *